United States Patent
Väyrynen

(10) Patent No.: US 9,557,806 B2
(45) Date of Patent: Jan. 31, 2017

(54) POWER SAVE MODE IN ELECTRONIC APPARATUS

(71) Applicant: Creoir Oy, Oulu (FI)

(72) Inventor: Pekka Väyrynen, Oulu (FI)

(73) Assignee: CREOIR OY, Oulu (FI)

( * ) Notice: Subject to any disclaimer, the term of this patent is extended or adjusted under 35 U.S.C. 154(b) by 233 days.

(21) Appl. No.: 14/246,694

(22) Filed: Apr. 7, 2014

(65) Prior Publication Data

US 2015/0149802 A1 May 28, 2015

(30) Foreign Application Priority Data

Nov. 22, 2013 (EP) ..................................... 13194044

(51) Int. Cl.
  *G06F 1/32* (2006.01)
  *G06F 3/0488* (2013.01)
  *G06F 3/0484* (2013.01)

(52) U.S. Cl.
  CPC ............. *G06F 1/3296* (2013.01); *G06F 1/329* (2013.01); *G06F 1/3265* (2013.01); *G06F 1/3287* (2013.01); *G06F 3/0484* (2013.01); *G06F 3/0488* (2013.01); *G06F 3/04883* (2013.01); *Y02B 60/1282* (2013.01)

(58) Field of Classification Search
  None
  See application file for complete search history.

(56) References Cited

U.S. PATENT DOCUMENTS

| 8,588,749 | B1 | 11/2013 | Sadhvani et al. |
| 2008/0318616 | A1 | 12/2008 | Chipalkatti et al. |
| 2012/0077554 | A1* | 3/2012 | Ahn .................... H04W 52/027 455/574 |
| 2013/0007482 | A1* | 1/2013 | Rodriguez ........ H04W 52/0251 713/320 |

FOREIGN PATENT DOCUMENTS

| EP | 2 034 388 A1 | 3/2009 |
| EP | 2 447 819 A2 | 5/2012 |

OTHER PUBLICATIONS

Search Report issued in European Patent Application No. 13 19 4044 dated Jan. 31, 2014.
Jun. 2, 2015 Search Report issued in European Patent Application No. 13194044.7.

* cited by examiner

Primary Examiner — Kim Huynh
Assistant Examiner — Paul J Yen
(74) Attorney, Agent, or Firm — Oliff PLC

(57) ABSTRACT

This document discloses a solution for employing a power-save mode in an electronic device providing, in a display unit, a plurality of home screens and a mechanism to switch from one home screen to another home screen in response to a user input received through user input means of the electronic device. At least one of the home screens is a home screen for a power-save mode of the electronic apparatus and, upon detecting a user input causing a switch to the home screen for the power-save mode, the electronic device switches on at least some of the power-save features of the electronic device.

24 Claims, 3 Drawing Sheets

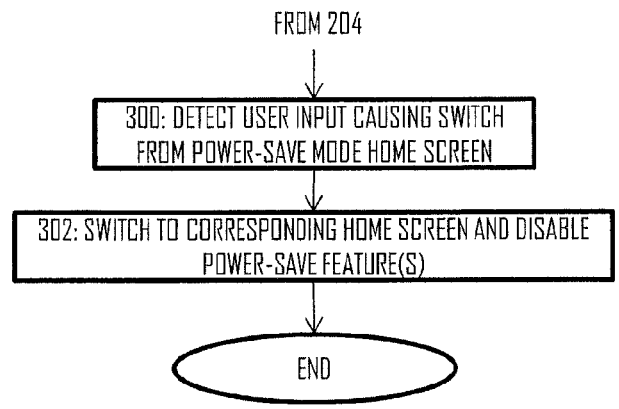
Fig 3
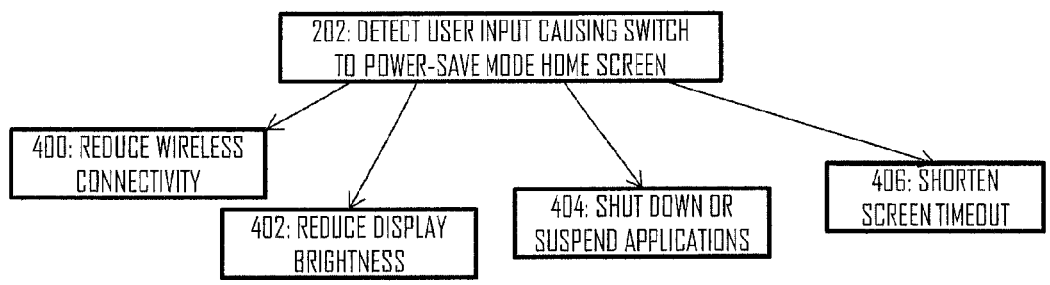
Fig 4
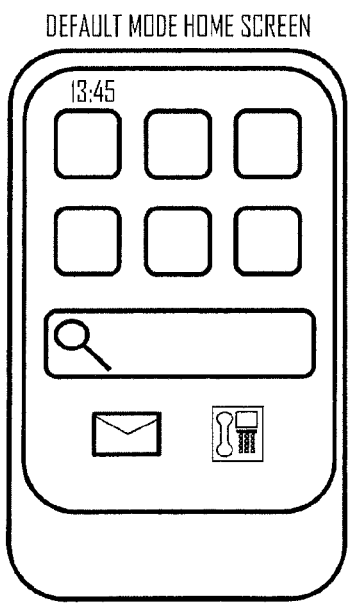 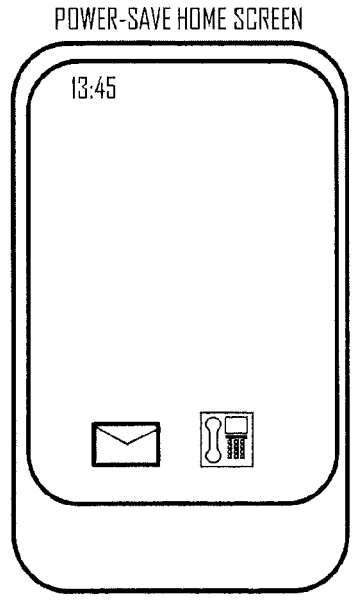
Fig 5A	Fig 5B

POWER SAVE MODE IN ELECTRONIC APPARATUS

TECHNICAL FIELD

The invention relates to use of a power-save mode in an electronic apparatus comprising a display screen.

BACKGROUND

Power-save modes are used particularly in battery-operated devices to reduce power consumption and to prolong operational time of the device. Typically, the device reduces features or functions in the power-save mode, e.g. shuts down running applications or reduces display brightness.

BRIEF DESCRIPTION

According to an aspect, there I provided a method for employing a power-save mode in an electronic device, the method comprising: providing, in a display unit of the electronic device, a plurality of home screens; providing a mechanism to switch from one home screen to another home screen in response to a user input received through user input means of the electronic device, wherein at least one of the home screens is a home screen for a power-save mode of the electronic apparatus and, upon detecting a user input causing a switch to the home screen for the power-save mode, causing the electronic device to switch on at least some of the power-save features of the electronic device.

According to another aspect, there is provided an apparatus comprising at least one processor and at least one memory storing a computer program code, wherein the least one memory and the computer program code are configured, with the at least one processor, to cause the apparatus to: configure a display unit of an electronic device to provide a plurality of home screens; provide a mechanism to switch from one home screen to another home screen in response to a user input received through a user input device of the electronic device, wherein at least one of the home screens is a home screen for a power-save mode of the apparatus, and upon detecting a user input causing a switch to the home screen for the power-save mode, cause the electronic device to switch on at least some of power-save features of the electronic device.

According to another aspect, there is provided a computer program product embodied on a non-transitory distribution medium readable by a computer and comprising program instructions which, when read and executed by the computer, execute a computer process comprising: providing, in a display unit of the electronic device, a plurality of home screens; providing a mechanism to switch from one home screen to another home screen in response to a user input received through user input means of the electronic device, wherein at least one of the home screens is a home screen for a power-save mode of the electronic apparatus and, upon detecting a user input causing a switch to the home screen for the power-save mode, causing the electronic device to switch on at least some of the power-save features of the electronic device.

BRIEF DESCRIPTION OF THE DRAWINGS

In the following the invention will be described in greater detail by means of preferred embodiments with reference to the attached drawings, in which

FIG. 3 is an embodiment of the process of FIG. 2;

FIG. 4 illustrates embodiments of power-save features triggered in the process of FIG. 2;

FIGS. 5A and 5B illustrate a default home screen and a power-save home screen with reduced features;

DETAILED DESCRIPTION OF THE INVENTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
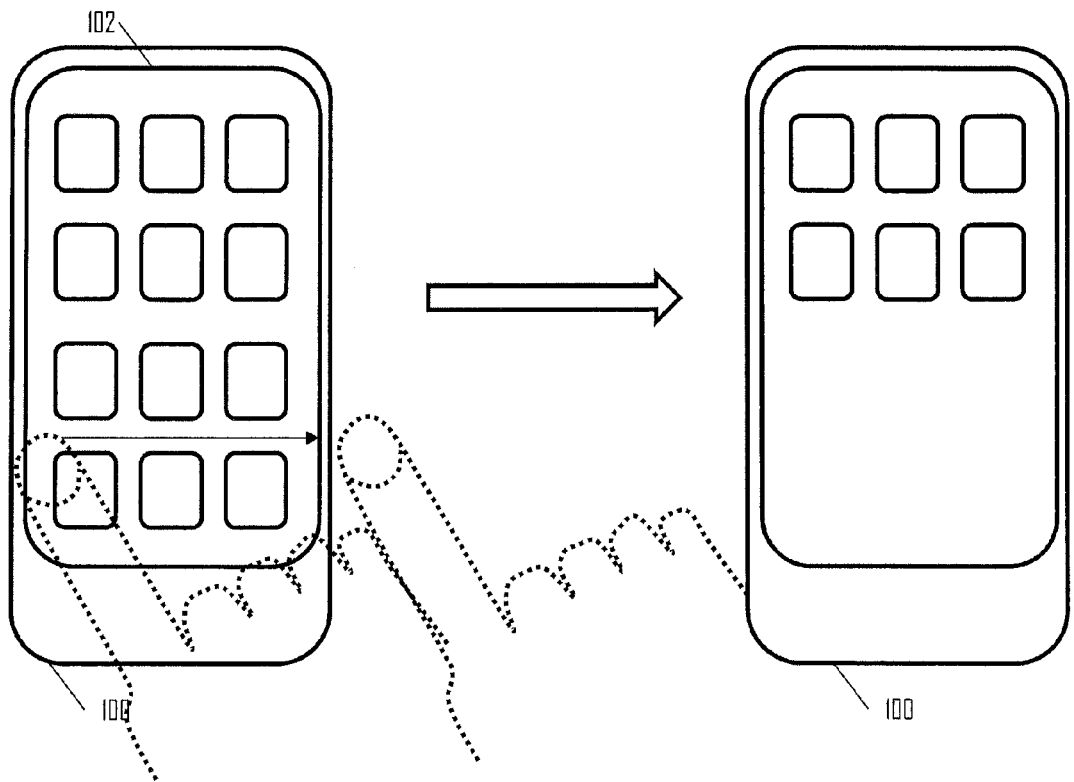
FIG. 1 is illustrates navigation between home screens in an electronic device.

FIG. 1 illustrates operation of a state-of-the-art electronic device 100 such as a smart phone, tablet computer, or a media player device. The electronic device 100 may be a portable electronic device and, in some embodiments, a handheld or palm device. Further examples of the electronic device include mobile phones, MP3 players, personal digital assistants (PDA), a wrist computer, and a handheld game console.

In an embodiment, the electronic device 100 comprises a touch-sensitive display 102 responsive to user inputs applied to a display screen 102 of the device. The user may use a finger or a stylus as a pointer to perform pointing or swiping gestures on the display 102. The electronic device may detect the pointing gesture upon sensing proximity of a pointer on a location or an area on the touch-sensitive display. In capacitive touch-sensitive displays, the pointer does not even need to contact the display. The pointing gesture may be detected when the touch-sensitive display does not sense movement of the pointer on a touch-sensitive surface of the display. The electronic device may detect the swipe gesture upon sensing the proximity of the pointer on a location of the display and subsequent sensing of continuous motion of the pointer along the surface of the display.

The electronic device may be configured to display a plurality of home screens on the display screen 102 under the same operating system. A home screen may be defined as a starting or default display screen displayed when the device has been powered-up and has completed its boot sequences. The home screen may be understood as a home screen of an operating system of the electronic device. The home screen may display a desktop of the electronic device or a portion of the desktop. The portion of the desktop may refer to one home screen in case the desktop is divided into a plurality of parallel home screens. The home screen may be defined as the topmost level of a screen hierarchy of the device and the user may navigate from the home screen to other screens by operating a user input device of the electronic device 100. In typical home screens, the electronic device 100 may display a list of applications installed to the electronic device, and different home screens may comprise at least partially different applications. In some contexts, the applications may comprise one or more software widgets or applets. A widget or the applet may distinguish from applications installed to the electronic device in that they are typically small applications dedicated to a single task and used as a plug-in for larger applications.

The plurality of home screens may be considered to reside on the same level of hierarchy even though one of the home screens is the default home screen displayed upon pressing a home button of the electronic device and/or upon booting the electronic device. The electronic device may provide a mechanism for the user to navigate between the multiple home screens. A typical mechanism for the navigation in modern devices comprising the touch-sensitive display is a touch-swipe input illustrated in FIG. 1. When the user performs a swipe input on the display and when the electronic device senses the swipe input, the electronic device switches from one home screen to another. In most operating systems such as the iOS® up to at least release 7 and Android® up to at least release 4.4 "KitKat", the swipe input needs to be horizontal (from the user's point of view). However, the operating system might equally support vertical swipe input for the same operation.

It should be appreciated that other mechanisms for navigating between the parallel home screens may be provided. Another example of the electronic device may employ navigation buttons to navigate between the home screens.

A common feature in battery-operated electronic devices is a power-save mode in which at least some of the features are reduced or even disabled in order to save battery power and prolong operational time of the device. In some electronic devices, the power-save mode is entered upon detecting inactivity in user interface for a determined duration. Such solutions may be inconvenient for the user because if the duration is configured to be short, a small break may trigger the power-save mode even though the user still wants to use the device. On the other hand, a longer duration may in many situations unnecessarily delay the entering to the power-save mode. The optimal duration varies all the time and, as a consequence, it would be optimal for the user to determine when to switch to the power-save mode. However, in many prior art solutions, the switch is inconveniently hidden into a settings menu to which the user has to first navigate in order to trigger the power-save mode. This is inconvenient for many users.

Figure 2:
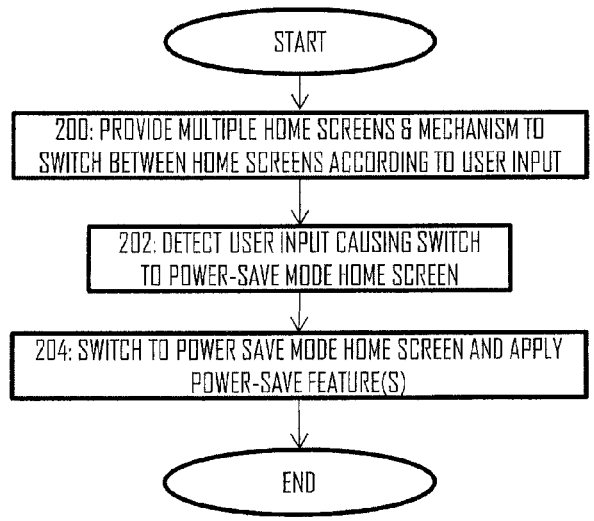
FIG. 2 is a flow diagram of a process for employing a power-save mode in an electronic device according to an embodiment of the invention.

FIG. 2 illustrates an embodiment of a method for operating the power-save mode in the electronic device 100. The method may be executed as one or more computer programs by at least one processor of the electronic device 100. An initial situation in the embodiment of FIG. 2 may be that the electronic device has been powered on and is in an operational state. The electronic device may currently display a home screen, a menu screen, or an application display screen. Referring to FIG. 2, the method comprises providing, in a display unit 102 of the electronic device 100, a plurality of home screens (block 200). The method further comprises providing (block 200) a mechanism to switch from one home screen to another home screen in response to a user input received through user input means or a user input device of the electronic device. At least one of the home screens is a home screen for a power-save mode of the electronic apparatus. In block 202, a user input causing a switch to the home screen for the power-save mode is detected. As a response to the detection in block 202, the electronic device is configured to switch on at least some of the power-save features of the electronic device. Additionally, the display may be configured to switch to the home screen of the power-save mode.

Associating a home screen with a power-save mode provides a convenient way to switch the power-save mode on and off, because navigation between the home screens is very simple in the modern electronic devices. The user needs not to find the settings menu and navigate through the setting menu in order to trigger the power-save mode or to switch the operating system to one consuming less power. The inconveniences of the timer-based solutions are avoided as well.

In an embodiment employing the touch-sensitive display, switching the power-save mode on/off is realized in a home screen with a single swipe gesture causing switch to/from the home screen of the power-save mode.

In an embodiment, the power-save home screen may comprise less icons and/or applications than the other home screen(s). In an embodiment, the number of executable applications and/or functions may be reduced. For example, the electronic device 100 may support only core functions in the power-save mode. Such core functions may include making and receiving phone calls, executing applications that do not require Internet connectivity, executing applications that do not cause high power consumption (for example applications that are not video gaming or video playback applications), etc. Accordingly, the power-save home screen may enable the user to switch between a multi-purpose device and a basic feature device.

Switching the power-save mode off is equally simple. FIG. 3 illustrates an embodiment of the method of FIG. 2. An initial situation of the process of FIG. 3 is that the electronic device currently operates in the power-save mode and displays the corresponding home screen. In block 300, a user input causing a switch from the power-save mode home screen to a non-power-save mode home screen is detected. As a consequence, the electronic device 100 is configured to switch to the home screen indicated by the user input and to disable the power-save feature(s) activated in block 204. The operation of the electronic device may thus be reverted to the same situation as where it was before in block 200. For example, any functions reduced when switching to the power-save mode may be reactivated. If wireless connectivity features have been reduced, they may be returned upon switching back to the home screen displayed in block 200.

In an embodiment, the power-save mode is switched on/off through the home screen navigation. The user may select and execute an application or a function in any home screen, e.g. in either power-save mode or in a default operational mode, and switch the power-save mode on/off by navigating to the corresponding home screen.

In embodiments where the electronic device 100 comprises a home button, the home button may navigate the display screen to a home screen, wherein the home screen mapped to the home button may be the home screen for the power-save mode or the home screen for the non-power-save mode. In an embodiment, the user may select the power-save home screen to be associated with the home button. As a consequence, when the electronic device detects a press of the home button, the electronic device may switch to the power-save home screen and the power-save mode. Equally, the power save home screen may be selectively associated with the default (non-power-save) home screen according to user-input configurations. In situations where a non-power-save home screen is associated with the home button, the electronic device may switch from the power-save home screen to the non-power-save home screen upon detecting the press of the home button.

In an embodiment, the electronic device 100 may provide functionality where the user may select applications for each home screen. It is known in the above-described operating systems that an icon of an application may be moved from one home screen to another. By using such a function, the user may select the applications that enabled in the power-save mode by moving icons of such applications to the power-save home screen. From the viewpoint of the electronic device, when it detects a user input moving an icon of an application from a non-power-save home screen to a power-save home screen, the electronic device may change the power-save features by enabling the execution of the application in the power-save mode associated with the power-save home screen. On the other hand, when the electronic device detects a user input moving the icon of from the power-save home screen to the non-power-save home screen, the electronic device may change the power-save features by disabling the execution of the application in the power-save mode associated with the power-save home screen. Similarly, in an installation phase of an application, the electronic device may provide the user with a selection option as to which home screen the user wants to install the application. If the application is installed to the power-save home screen, the electronic device may enable the operation of the application in the power-save mode associated with the power-save home screen. Otherwise, it may disable the operation of the application in the power-save mode associated with the power-save home screen. In connection with installing and/or moving the application to the power-save home screen, the electronic device may check a power consumption profile of the application. If the power consumption profile indicates that the application consumes high amount of power, the electronic device may output a warning of the high power consumption or ask the user to confirm whether or not the user still wants to move/install the application to the power-save home screen regardless of the high power consumption. If the user confirms, the electronic device may allow the moving/installation of the application to the power-save home screen.

Let us now consider some embodiments of the power-save features with reference to FIG. 4. Upon switching the power-save mode on and causing the display of the power-save home screen, the electronic device may execute one or more of the blocks 400 to 406 of FIG. 4. In block 400, the electronic device 100 is configured to reduce wireless connectivity. Block 400 may comprise switching off at least some of the radio connections or circuitries, e.g. IEEE 802.11 (WLAN) or Bluetooth, or changing to a cellular radio communication network that consumes less power in the electronic device 100, e.g. switching from an LTE (Long-term Evolution) cellular radio connection to a second generation cellular radio connection such as GSM (Global System for Mobile Communications). In block 402, the electronic device 100 is configured to reduce display brightness. In block 404, the electronic device 100 is configured to shut down or suspend operation of running applications. In another embodiment, block 404 comprises reducing a displayed list of executable applications. In an embodiment of block 404, the electronic device 100 reduces or suspends activity of one or more running applications. For example, an e-mail or a social media application may be suspended from connecting to a server to check the latest messages/posts/updates. As another example, an application may be suspended from connecting to a server to check software/firmware updates. In general, internet connectivity of the applications may be suspended by reconfiguring the applications. Accordingly, the internet connection may still be maintained but selected application(s) may be prevented from accessing the Internet. In block 406, a display screen timeout is shortened. Block 406 may comprise reducing the duration the electronic device has to detect continuous inactivity from the user before the electronic device may switch off the display screen.

In yet another embodiment, the electronic device 100 is configured to reduce processing capacity of at least one processor comprised in the electronic device. In an embodiment, one or more cores of the processor(s) may be shut down in order to reduce the power consumption.

It should be appreciated that various other power-save features are used in state-of-the-art electronic devices and the embodiments listed above are described as examples of possible solutions.

FIGS. 5A and 5B illustrate embodiments of a default home screen and a power-save home screen. The two home screens may comprise at least some of the same icons representing available applications and/or functions. Such icons are in this example a voice call icon used to execute a phone call function and a letter icon representing a messaging function or application. Similarly, some basic functions such as a clock and a calendar may be maintained in both displays and operational modes. The two home screens differ from each other in the number of available functions or applications. For example, an internet search function has been disabled in the power-save mode of FIG. 5B as well as a number of applications represented in FIG. 5A by the rounded rectangles.

According to another aspect, the home screens may have other associations than the operational mode and, particularly, switching the power-save mode on and off. In an embodiment, one home screen is associated with use of a first SIM (subscriber identity module) card of a first cellular communication network and another home screen is associated with use of a second SIM card of a second cellular communication network different from the first cellular communication network. For example, the first SIM card may be used to connect to a network of a first network operator and the second SIM card may be used to connect to a network of a second network operator.

Figure 6:
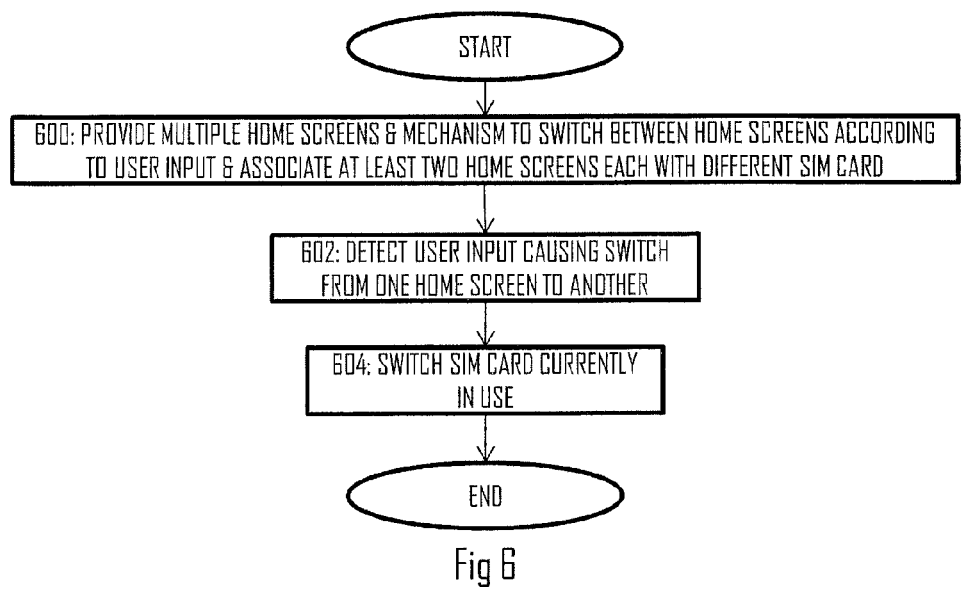
FIG. 6 illustrates a flow diagram of another embodiment for associating home screens with special functions.

FIG. 6 illustrates an embodiment of a method for operating cellular network connections in a multi-SIM electronic device. Referring to FIG. 6, the method comprises providing, in a display unit of the electronic device, a plurality of home screens and associating one home screen with use of a first SIM card of a first cellular communication network and another home screen with use of a second SIM card of a second cellular communication network (block 600). The method further comprises providing a mechanism to switch from one home screen to another home screen in response to a user input received through user input means or a user input device of the electronic device. Upon detecting a user input causing a switch from to the home screen of the first SIM card to the home screen of the second SIM card (block 602), the electronic device is configured to switch disable a radio connection through the first SIM card and enable a radio connection through the second SIM card. In general, when the electronic device detects that the user selects the home screen of a SIM card, the electronic device may carry out a check of currently used SIM card. If the SIM card of the currently selected home screen is not currently in use, the electronic device may switch from the currently used SIM card to the SIM card associated with the selected home screen. If the SIM card of the currently selected home screen is already in use, the electronic device may prevent switch of the SIM card.

This embodiment enables convenient switch of the SIM card without needing to browse through the settings menu and/or rebooting the electronic device.

Figure 7:
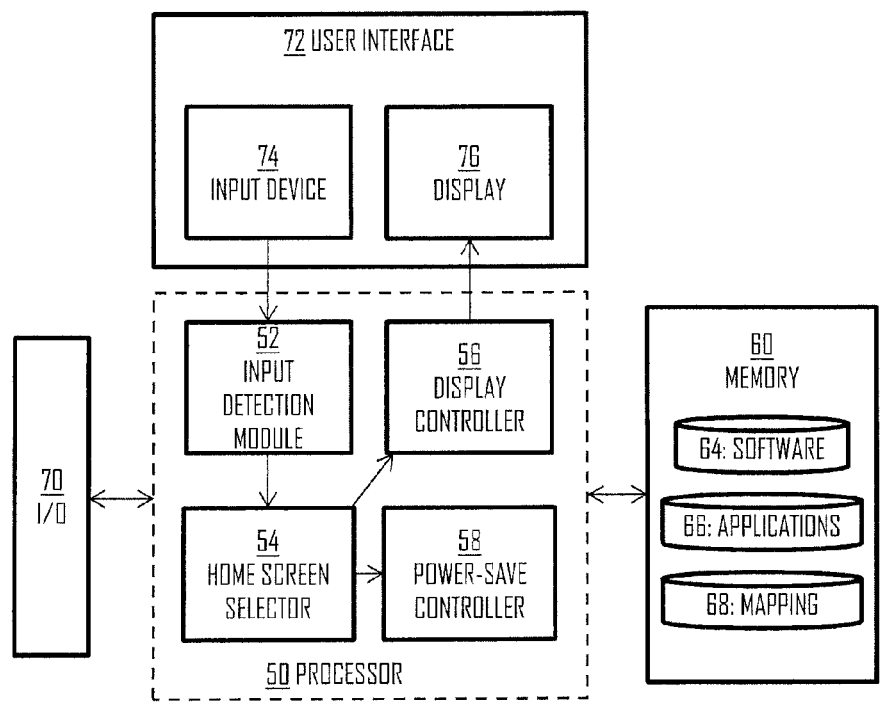
FIG. 7 illustrates a block diagram of an apparatus according to an embodiment of the invention.

FIG. 7 illustrates a block diagram of a structure of an apparatus according to an embodiment of the invention. The apparatus may comprise the above-described electronic device 100, or the apparatus may be comprised in the electronic device 100, e.g. it may form a part of the electronic device 100. In an embodiment, the apparatus comprises at least one processor 50 or a processing circuitry. The apparatus may comprise at least one memory 60 including a computer program code 64. The at least one memory 60 and the computer program code 64 are configured, with the at least one processor, to cause the apparatus to carry out the method of FIG. 2 or any one of the embodiments described above. The memory 60 may further store one or more applications installed to the apparatus. The applications may include the above-described applications and also one or more operating systems executed in the apparatus.

Referring to FIG. 7, the apparatus may comprise a user interface 72 comprising an input device 74 and a display unit 76, e.g. a display screen. The input device 74 and the display unit may be combined in the form of a touch-sensitive display. In other embodiments, the input device may comprise one or more buttons, e.g. menu navigation buttons. The apparatus may further comprise input/output (I/O) interface 70. The I/O interface 70 may comprise radio interface components providing the apparatus with radio communication capability. The radio interface components may comprise hardware and/or software configured to cause the radio interface components operate according to determined one or more radio communication protocols, e.g. cellular radio protocols (UMTS, GSM, LTE, LTE-Advanced), IEEE 802.11 protocols, IEEE 802.15-based protocols (Bluetooth), etc.

The processor 50 may comprise as sub-circuitries an input detection module 52 configured to interpret or decode user inputs sensed by the input device. For example, the input detection module 52 may be configured to detect navigation inputs, e.g. a navigation input instructing navigation from one home screen to another home screen. Upon detecting a navigation input between home screens, the input detection module 52 may output a control signal to a home screen selector module 54 configured to select a home screen matching with the detected navigation input. The home screen selector module 54 may further check whether or not the selected home screen is associated with a special function, e.g. the power-save mode or the SIM card not currently in use. The memory 60 may store a mapping table 68 mapping home screens with such special functions. For example, if the mapping table 68 indicates that the selected home screen is mapped to the power-save mode, the home screen selector module 54 may trigger a power-save controller 58 to apply at least some of the power-save features. The power-save features of each power-save home screen may be stored in the mapping table 68 or in another record in the memory 60. The power-save features may be fixed for each home screen or they may be modified according to user inputs. For example, a settings menu may be output in order provide the user with options to select the power-save features the wants to associate with each power-save home screen. The power-save features selected by the user may then be stored in association with the power-save home screen in the memory and applied by the power-save controller 58 when the user navigates to the power-save home screen.

In embodiments where the mapping table 68 indicates that the selected home screen is mapped to a specific SIM card, the home screen selector module 54 may cause a SIM card selector module (not shown) to select and activate a SIM card mapped to the selected home screen.

Upon selecting the home screen, the home screen selector module 54 may output a control signal to a display controller 56 to display the selected home screen. The display controller 56 may then configure the display unit 76 to display the corresponding home screen to the user.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 6 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to electronic devices described above and, additionally, to other electronic devices. The state-of-the-art of electronic devices develops rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method for employing a power-save mode in an electronic device, the method comprising:
providing, in a touch-sensitive display unit of the electronic device, a desktop divided into a plurality of parallel home screens comprising a home screen for a power-save mode of the electronic device and a home screen for a non-power-save mode of the electronic device;

providing a navigation mechanism to navigate from the home screen of the non-power-save mode to the home screen of the power-save mode in response to a swipe touch input received through the touch-sensitive display unit, and, upon detecting a swipe touch input causing a switch to the home screen for the power-save mode, causing the electronic device to switch on at least some of the power-save features of the electronic device, wherein the non-power-save home screen includes icons of a first group of icons of applications, and the power-save home screen includes icons of a second group of icons of applications, further comprising detecting a user input moving an icon of an application from the non-power-save home screen to the power-save home screen and, in response to the detection, enabling execution of the moved application in the power-save mode.

2. The method of claim 1, further comprising: upon detecting a swipe touch input causing a switch from the home screen for the power-save mode to the home screen of the non-power-save mode, causing the electronic device to switch off the power-save features of the electronic device.

3. The method of claim 1, wherein the display unit and the touch-sensitive display unit are realized with a touch-sensitive display and wherein the user input causing the switch from the home screen for a power-save mode to the home screen for the non-power-save mode is a touch-swipe input.

4. The method of claim 1, wherein the at least some power-save features switched on when switched to the home screen for the power-save mode comprises reducing wireless connectivity of the electronic device.

5. The method of claim 4, wherein the reduction of the wireless connectivity comprises switching a cellular radio communication connection to a second generation cellular communication network.

6. The method of claim 1, wherein the at least some power-save features switched on when switched to the home screen for the power-save mode are predefined and applied automatically in connection with switching to the home screen for the power-save mode.

7. The method of claim 1, wherein the at least one of the home screens is a home screen for a default mode of the electronic device where less power-save features are applied than in the power-save mode, the method further comprising displaying at least partially the same list of executable applications in the home screen for the default mode and in the home screen for the power-save mode.

8. The method of claim 1, further comprising: upon detecting a user input causing a switch from the home screen for the power-save mode to another home screen, causing the electronic device to switch off at least some of the power-save features of the electronic device.

9. The method of claim 8, further comprising reverting, upon switching to the other home screen, functions of the electronic device used before switching to the home screen for the power-save mode.

10. The method of claim 1, wherein the home screen is a topmost screen in a screen hierarchy of the electronic device and the plurality of home screens, including the home screen for the power-save mode, are provided on the same hierarchy level in an operating system.

11. The method of claim 1, wherein the home screen for the power-save mode and the home screen of the non-power-save mode both employ screens of equal size.

12. The method of claim 1, wherein the non-power-save home screen includes icons of a first group of icons of applications, and the power-save home screen includes icons of a second group of icons of applications, further comprising detecting a user input moving an icon of an application from the non-power-save home screen to the power-save home screen and, in response to the detection, enabling execution of the moved application in the power-save mode.

13. An apparatus comprising:
at least one processor;
at least one memory storing a computer program code, wherein the least one memory and the computer program code are configured, with the at least one processor, to cause the apparatus to:
configure a touch-sensitive display unit of an electronic device to provide a desktop divided into a plurality of parallel home screens comprising a home screen for a power-save mode of the electronic device and a home screen for a non-power-save mode of the electronic device;
provide a navigation mechanism to navigate from the home screen of the non-power save mode to the home screen of the power-save mode in response to a swipe touch input received through the touch-sensitive display unit, and
upon detecting a swipe touch input causing a switch to the home screen for the power-save mode, cause the electronic device to switch on at least some of power-save features of the electronic device,
wherein the non-power-save home screen includes icons of a first group of icons of applications, and the power-save home screen includes icons of a second group of icons of applications, wherein the least one memory and the computer program code are configured, with the at least one processor, to further cause the apparatus to: detect a user input moving an icon of an application from the non-power-save home screen to the power-save home screen and, in response to the detection, enable execution of the moved application in the power-save mode.

14. The apparatus of claim 13, wherein the least one memory and the computer program code are configured, with the at least one processor, to cause the apparatus to cause the electronic device to switch off the power-save features of the electronic device upon detecting a user input causing a switch from the home screen for the power-save mode to the home screen for the non-power-save mode.

15. The apparatus of claim 13, wherein the display unit and the user input device are realized with the touch-sensitive display unit and wherein the detected user input causing the switch from the home screen of the power-save mode to the home screen of the non-power-save mode is a touch-swipe input.

16. The apparatus of claim 13, wherein the at least some power-save features switched on when switched to the home screen for the power-save mode comprises reducing wireless connectivity of the electronic device.

17. The apparatus of claim 16, wherein the least one memory and the computer program code are configured, with the at least one processor, to cause the apparatus to reduce the wireless connectivity by switching a cellular radio communication connection to a second generation cellular communication network.

18. The apparatus of claim 13, wherein the at least one of the home screens is a home screen for a default mode of the electronic device where less power-save features are applied than in the power-save mode, and wherein the least one memory and the computer program code are configured, with the at least one processor, to cause the apparatus to cause the display unit to display at least partially the same list of executable applications in the home screen for the default mode and in the home screen for the power-save mode.

19. The apparatus of claim 13, wherein the least one memory and the computer program code are configured, with the at least one processor, to cause the apparatus to cause the electronic device to switch off at least some of the power-save features of the electronic device upon detecting a user input causing a switch from the home screen for the power-save mode to another home screen.

20. The apparatus of claim 19, wherein the least one memory and the computer program code are configured, with the at least one processor, to cause the apparatus to revert, upon switching to the other home screen, functions of the electronic device used before switching to the home screen for the power-save mode.

21. The apparatus of claim 13, wherein the home screen is a topmost screen in a screen hierarchy of the electronic device and the plurality of home screens, including the home screen for the power-save mode, are provided on the same hierarchy level in an operating system.

22. The apparatus of claim 13, wherein the home screen for the power-save mode and the home screen of the non-power-save mode both employ screens of equal size.

23. A method for employing a power-save mode in an electronic device, the method comprising:
providing, in a touch-sensitive display unit of the electronic device, a desktop divided into a plurality of parallel home screens comprising a home screen for a power-save mode of the electronic device and a home screen for a non-power-save mode of the electronic device;
providing a navigation mechanism to navigate from the home screen of the non-power-save mode to the home screen of the power-save mode in response to a swipe touch input received through the touch-sensitive display unit,
and, upon detecting a swipe touch input causing a switch to the home screen for the power-save mode, causing the electronic device to switch on at least some of the power-save features of the electronic device,
wherein the non-power-save home screen includes icons of a first group of icons of applications, and the power-save home screen includes icons of a second group of icons of applications, further comprising detecting a user input moving an icon of an application from the power-save home screen to the non-power-save home screen and, in response to the detection, disabling execution of the moved application in the power-save mode.

24. An apparatus comprising:
at least one processor;
at least one memory storing a computer program code, wherein the least one memory and the computer program code are configured, with the at least one processor, to cause the apparatus to:
configure a touch-sensitive display unit of an electronic device to provide a desktop divided into a plurality of parallel home screens comprising a home screen for a power-save mode of the electronic device and a home screen for a non-power-save mode of the electronic device;
provide a navigation mechanism to navigate from the home screen of the non-power save mode to the home screen of the power-save mode in response to a swipe touch input received through the touch-sensitive display unit, and
upon detecting a swipe touch input causing a switch to the home screen for the power-save mode, cause the electronic device to switch on at least some of power-save features of the electronic device,
wherein the non-power-save home screen includes icons of a first group of icons of applications, and the power-save home screen includes icons of a second group of icons of applications, wherein the least one memory and the computer program code are configured, with the at least one processor, to further cause the apparatus to: detect a user input moving an icon of an application from the power-save home screen to the non-power-save home screen and, in response to the detection, disable execution of the moved application in the power-save mode.

* * * * *